(12) United States Patent
Fu

(10) Patent No.: US 11,338,297 B2
(45) Date of Patent: May 24, 2022

(54) SAMPLE RACK, SAMPLE ACCESS KIT AND SAMPLE ACCESS SYSTEM

(71) Applicant: BOE TECHNOLOGY GROUP CO., LTD., Beijing (CN)

(72) Inventor: Maoyong Fu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 346 days.

(21) Appl. No.: 16/518,043

(22) Filed: Jul. 22, 2019

(65) Prior Publication Data
US 2020/0206746 A1  Jul. 2, 2020

(30) Foreign Application Priority Data

Jan. 2, 2019  (CN) .......................... 201910001615.9

(51) Int. Cl.
*B01L 9/06* (2006.01)
*G01N 35/00* (2006.01)

(52) U.S. Cl.
CPC .......... *B01L 9/06* (2013.01); *G01N 35/00732* (2013.01); *G01N 2035/00752* (2013.01); *G01N 2035/00801* (2013.01)

(58) Field of Classification Search
CPC ................ B01L 9/06; B01L 2300/023; B01L 2300/021; B01L 2200/147; B01L 9/56; G01N 35/00732; G01N 2035/00752; G01N 2035/00801; G01N 2035/00445; G01N 35/00871
See application file for complete search history.

(56) References Cited

U.S. PATENT DOCUMENTS

| 4,969,336 A | 11/1990 | Knippscheer et al. |
| 6,292,102 B1 * | 9/2001 | Smith ................... G01N 27/048 340/604 |
| 6,610,936 B2 * | 8/2003 | Gillespie ............. G06F 3/04883 178/18.01 |
| 2006/0051239 A1 * | 3/2006 | Massaro .......... G01N 35/00732 422/63 |

(Continued)

FOREIGN PATENT DOCUMENTS

| CN | 202018677 U | * 10/2011 |
| CN | 205694848 U | * 11/2016 |
| WO | WO-91/02203 A1 | 2/1991 |

OTHER PUBLICATIONS

First Office Action for CN Appl. No. 201910001615.9, dated Mar. 31, 2020.

*Primary Examiner* — Jill A Warden
*Assistant Examiner* — John McGuirk
(74) *Attorney, Agent, or Firm* — The Webb Law Firm

(57) ABSTRACT

This disclosure provides a sample rack, a sample access kit and a sample access system. The sample rack comprises: a rack body for placing a sample container; a position collector configured to acquire a position of the sample container placed on the rack body; and a communicator configured to transmit identification information of the sample rack and the acquired position of the sample container on the rack body. The sample access kit comprises the above-described sample rack and a sample container having an identification disposed thereon. The sample access system comprises the above-described sample access kit and a mobile terminal.

17 Claims, 5 Drawing Sheets

(56) References Cited

U.S. PATENT DOCUMENTS

| | | | | |
|---|---|---|---|---|
| 2008/0050279 A1* | 2/2008 | Fujita | ............... | G01N 35/00732 |
| | | | | 422/67 |
| 2010/0292961 A1* | 11/2010 | Moss | ..................... | G01D 4/002 |
| | | | | 702/188 |
| 2014/0230472 A1* | 8/2014 | Coradetti | .............. | F25D 29/008 |
| | | | | 62/125 |

* cited by examiner

SAMPLE RACK, SAMPLE ACCESS KIT AND SAMPLE ACCESS SYSTEM

CROSS-REFERENCE TO RELATED APPLICATIONS

The present patent application claims priority to Chinese Patent Application No. 201910001615.9, filed on Jan. 2, 2019, which is hereby fully incorporated herein by reference in its entirety.

TECHNICAL FIELD

The present invention relates to a sample rack, a sample access kit and a sample access system.

BACKGROUND

At present, hospitals have a large number of samples to be stored and extracted every day. A traditional access process needs human participation, in which the staff store and extract the samples. Moreover, there does not exist an effective real-time monitoring system for the traditional sample storage method.

SUMMARY

According to a first aspect of this disclosure, a sample rack is proposed, comprising:
a rack body for placing a sample container;
a position collector configured to acquire a position of the sample container in case where the sample container is placed on the rack body; and
a communicator configured to transmit identification information of the sample rack and the acquired position of the sample container.

In some embodiments, the rack body has a tray, and the position collector comprises: an array of grooves arranged on the tray for mating with respective sample containers, a switcher arranged in respective grooves, wherein the switcher is turned on when the sample container is inserted into the corresponding groove; and a position scanner configured to scan an ON-state of the switcher in the respective groove to determine the position of the sample container on the rack body.

In some embodiments, the switcher is composed of two conductive portions along with an insulating layer disposed therebetween.

In some embodiments, the sample rack comprises: a temperature sensor configured to sense a temperature of an environment and communicably connected with the communicator; and/or a humidity sensor configured to sense a humidity of the environment and communicatively connected with the communicator.

In some embodiments, the sample rack further comprises an alarm configured to send an alarm message when the sensed temperature or humidity of the environment reaches an alarm threshold, the alarm message including identification information of the sample rack on which the temperature sensor or humidity sensor is located.

In some embodiments, the sample rack further comprises an indicator configured to receive the position of the sample container from the communicator and indicate the position of the sample container.

In some embodiments, the sample rack further comprises a bottom compartment configured to receive at least a portion of the position collector.

This disclosure further provides a sample access kit, wherein the sample access kit comprises: the above-described sample rack; and a sample container having unique identification disposed thereon, the code encoding identification information of a sample contained in the sample container.

In some embodiments, the rack body has a tray, and the position collector comprises: an array of grooves arranged on the tray for mating with respective sample containers, a switcher arranged in respective grooves, wherein the switcher is turned on when the sample container is inserted into the corresponding groove; and a position scanner configured to scan an ON-state of the switcher in the respective groove to determine the position of the sample container on the rack body, wherein the switcher is composed of two conductive portions along with an insulating layer disposed therebetween; and a bottom of the sample container is provided with a metal coating, and when the sample container is inserted into the groove, the metal coating contacts the two conductive portions of the switcher in the respective groove, so that the switcher is turned on.

This disclosure further provides a sample access system, wherein the sample access system comprises: the above-described sample access kit; and a mobile terminal configured to: scan a code on the sample container to acquire identification information of the sample contained in the sample container; and communicate with the sample rack to acquire the identification information of the sample rack and the position of the sample container.

In some embodiments, the sample access system further comprises: a server configured to communicate with the mobile terminal to receive the identification information of the sample, the identification information of the sample rack accommodating the respective sample container, and the position of the sample container, and to automatically register them.

In some embodiments, the server is further configured to perform a registration operation after receiving the identification information of the sample, the identification information of the sample rack accommodating the respective sample container, and the position of the respective sample; and receive identification information of a sample to be inquired from a user, inquire the identification information of the sample rack accommodating the respective sample container and the position of the respective sample according to the identification information of the sample, and notify the user.

In some embodiments, the server is further configured to receive the identification information of the sample to be inquired via a terminal in communication with the server.

In some embodiments, the sample access system further comprises a preservation device configured to: place the sample access kit; in response to the placement of the sample access kit, communicate with the sample rack in the placed sample access kit via the communicator to acquire the identification information of the sample rack, and communicate with the server to transmit the acquired identification information of the sample rack, the identification information of the preservation device and related operation information of the preservation device to the server, wherein the related operation information at least comprises operation information about opening and closing of a door of the preservation device.

In some embodiments, the alarm is further configured to: transmit the alarm message to the server via the preservation device, when the sensed temperature or humidity of the environment reaches an alarm threshold.

In some embodiments, the sample extractor is further configured to: transmit the identification information of the preservation device where the sample rack accommodating the respective sample container is located to the user, upon receiving the identification information of the sample to be inquired from the user; and the sample rack further comprises a display device, and in case where the server receives the operation information about opening of the door of the preservation device from the preservation device where the sample rack accommodating the respective sample container is located, the server activates the display device of the sample rack accommodating the respective sample container to display the position of the sample to be inquired.

BRIEF DESCRIPTION OF THE DRAWINGS

In the accompanying drawings which are not necessarily drawn to scale, same reference numerals may describe similar components in different views. The same reference numeral with letter suffixes or different letter suffixes may represent different instances of a similar component. The drawings illustrate various embodiments by way of example, but not by way of limitation, and together with the description and the claims, serve to explain the disclosed embodiments. The same reference numeral will be used throughout the drawings to refer to the same or like part, where appropriate. Such embodiments are illustrative and not intended to serve as exhaustive or exclusive embodiments of the present device or method.

DETAILED DESCRIPTION

In order to enable a person skilled in the art to better understand the technical solution of this disclosure, this disclosure is described in detail below with reference to the accompanying drawings and the embodiments. The embodiments of this disclosure are described in further detail below with reference to the accompanying drawings and specific embodiments, but they cannot be construed as limitations to this disclosure.

The "first," "second," and similar words used in this disclosure do not denote any order, quantity, or importance, but rather distinguish different elements. The word "comprise" or "include" or the like, means that element preceding the word encompasses elements listed after the word, but does not exclude the possibility of encompassing other elements. The words "up", "down", "left", "right", etc. are used only to indicate relative position relations, which may also change accordingly when an absolute position of the described object changes.

In this disclosure, when it is described that a specific device is located between a first device and a second device, an intervening device may or may not be present between the specific device and the first device or the second device. When it is described that a specific device is connected to other devices, the specific device may be directly connected to the other devices without an intervening device, or may not be directly connected to the other devices with an intervening device.

All terms (including technical or scientific terms) used in this disclosure have the same meaning as understood by one of ordinary skill in the art to which this disclosure pertains, unless otherwise specifically defined. It will be further understood that terms, such as those defined in commonly used dictionaries, should be interpreted as having meanings that are consistent with their meanings in the context of related technologies and will not be interpreted in an idealized or overly formal sense, unless expressly defined so herein.

Techniques, methods, and device known to those of ordinary skill in the relevant art may not be discussed in detail, but are to be considered a part of the specification where appropriate.

Figure 1:
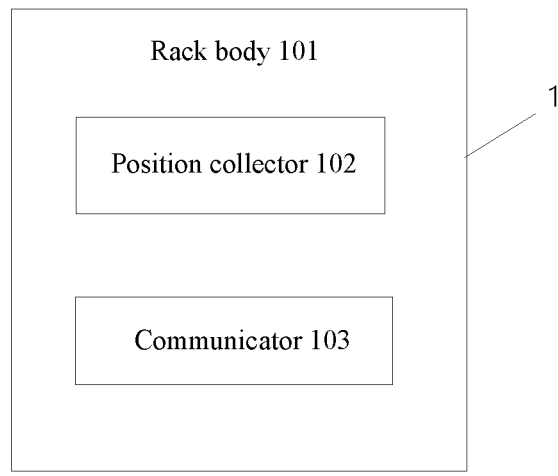
FIG. 1 is a block diagram showing a structure of a sample rack according to an embodiment of this disclosure.

According to a first aspect of this disclosure, a sample rack 1 is proposed. FIG. 1 is a block diagram showing a structure of a sample rack according to an embodiment of this disclosure. As shown in FIG. 1, the sample rack 1 comprises a rack body 101 for placing a sample container 201, and the sample rack 1 further comprises a position collector 102 and a communicator 103. The position collector 102 is configured to acquire a position of the sample container 201 on the sample rack 1 in case where the sample container 201 is placed on the rack body 101; and the communicator 103 is configured to transmit at least identification information of the sample rack and the position of the sample container 201 on the sample rack 1. The rack body 101 of the sample rack may be sample racks such as a petri dish sample rack, a test tube rack, or the like. The position of the sample container 201 on the sample rack 1 is acquired through the position collector 102, so that storage positions of the samples and the sample pieces are established automatically, manually operating steps are reduced, the work efficiency is improved, and at the same time the error rate is reduced. The identification information of the sample rack and the position of the sample container on the sample rack are transmitted via the communicator 103 so that operators can quickly acquire information about the samples for the convenience of storage and extraction.

In some embodiments, the rack body 101 has a tray 110, and the position collector 102 comprises an array of grooves 109 (shown in FIG. 2) arranged on the tray 110 for mating with respective sample containers 201. A switcher 111 is arranged in respective grooves, wherein the switcher 111 is turned on when the sample container 201 is inserted into a respective groove. The position collector 102 further comprises a position scanner 105 configured to scan an ON-state of the switcher 111 in the respective groove to determine the position of the sample container 201 on the rack body, so that the position of the sample container 201 on the sample rack can be directly and effectively located.

Figure 5:
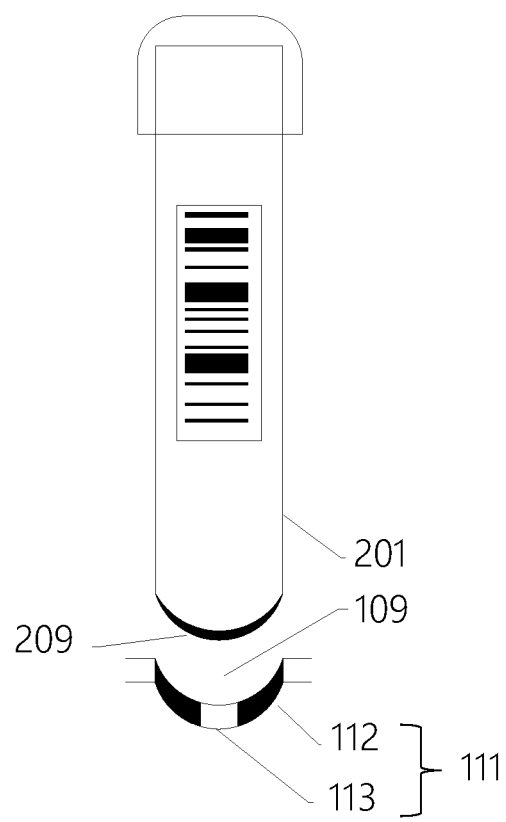
FIG. 5 is an enlarged partial view showing a sample container mating with an array of grooves according to an embodiment of this disclosure.

In some embodiments, as shown in FIG. 5, the switcher 111 is composed of two conductive portions 112 along with an insulating layer 113 disposed therebetween. A bottom surface 209 of the sample container 201 is made of a conductive material, so that when the bottom surface 209 of the sample container 201 contacts the two conductive portions 112 of the switcher, the switcher 111 in the groove 109 is turned on, such that the position scanner 105 can acquire the position of the sample container 201 on the rack body 101.

Figure 2:
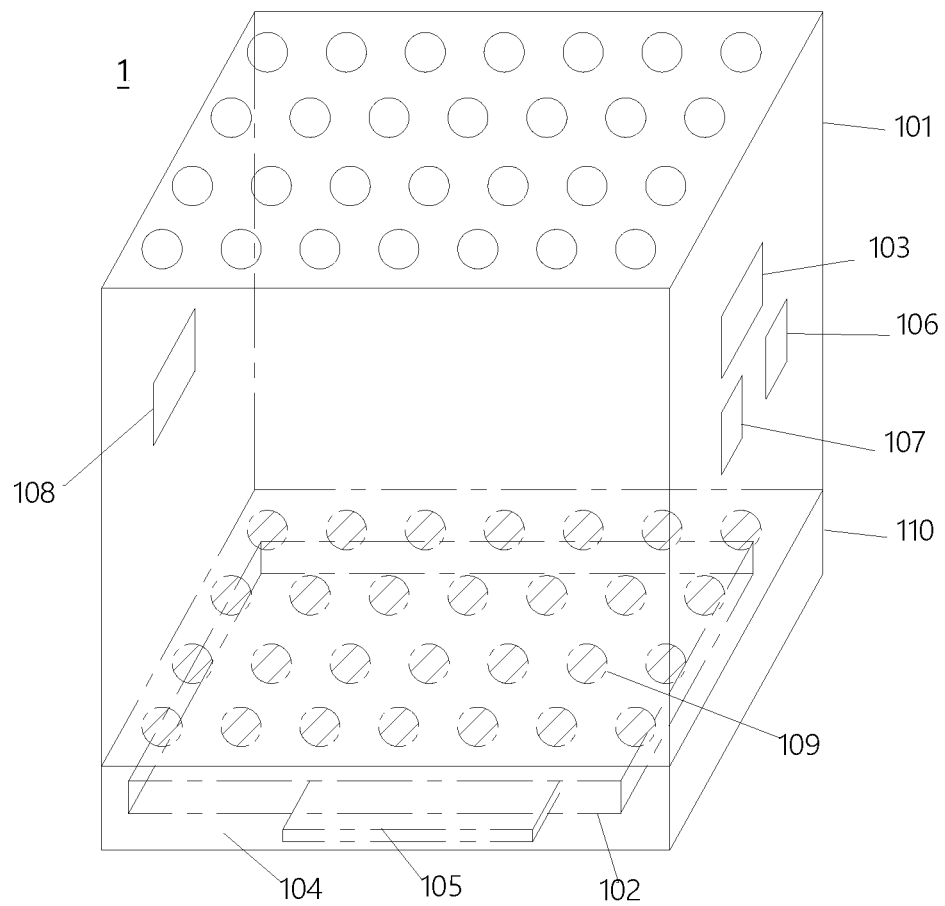
FIG. 2 is a schematic diagram showing a structure of a sample rack according to an embodiment of this disclosure.

In some embodiments, continue to refer to FIG. 2, the sample rack comprises a temperature sensor 106 configured to sense a temperature of the environment and communicably connected to the communicator 103. The temperature sensor 106 collects the temperature during the storage of the sample container 201 on the sample rack and transmit the detected environment temperature through the communicator 103. Temperature sensor 106 can measure and transmit the temperature in real time, periodically, or according to user instructions. The temperature sensor 106 may be implemented by means of a temperature sensor such as a thermocouple, a thermistor, and etc.

In some embodiments, continue to refer to FIG. 2, the sample rack comprises a humidity sensor 107 configured to sense humidity of the environment and communicatively connected to the communicator 103. The humidity sensor 107 collects humidity during the storage of the sample container 201 on the sample rack and transmit the monitored environment humidity through the communicator 103. The humidity sensor 107 may measure and transmit the humidity in real time, periodically, or according to user instructions. The humidity sensor 107 can be implemented by means of a humidity sensor such as a lithium chloride humidity sensor, a carbon humidity sensor, etc.

In some embodiments, the sample rack further comprises an alarm 108. As shown in FIG. 2, the alarm 108 is configured to transmit an alarm message when at least one of the sensed temperature and humidity of the environment reaches an alarm threshold. The alarm message includes identification information of the sample rack where the temperature sensor 106 and the humidity sensor 107 are located. At least one of temperature and humidity is collected over the storage period during which the sample container 201 is stored on the sample rack, and when an alarm value is reached, the alarm 108 transmits the alarm message through the communicator 103 to inform relevant operators of a change in the environment where the sample container 201 is located. Therefore, the change in chemical properties of the sample caused by environmental factors can be prevented from affecting the detection result of the sample. The alarm 108 may implement an alarm function using common products such as speaker, as well as sound and light alarm.

In some embodiments, the sample rack further comprises an indicator configured to receive the acquired position of the sample container from the communicator and to indicate the position of the received sample container. The indicator may be a display screen assembly or a light assembly on the sample rack.

In some embodiments, as shown in FIG. 2, the sample rack also includes a bottom compartment 104. The bottom compartment 104 is configured to house at least a portion of the position collector 102. Through the design of the bottom compartment 104 of the sample rack, there is enough space to dispose related circuits and modules, and the design of the bottom compartment 104 does not occupy excessive space in the horizontal direction, and thus is reasonable.

Figure 3:
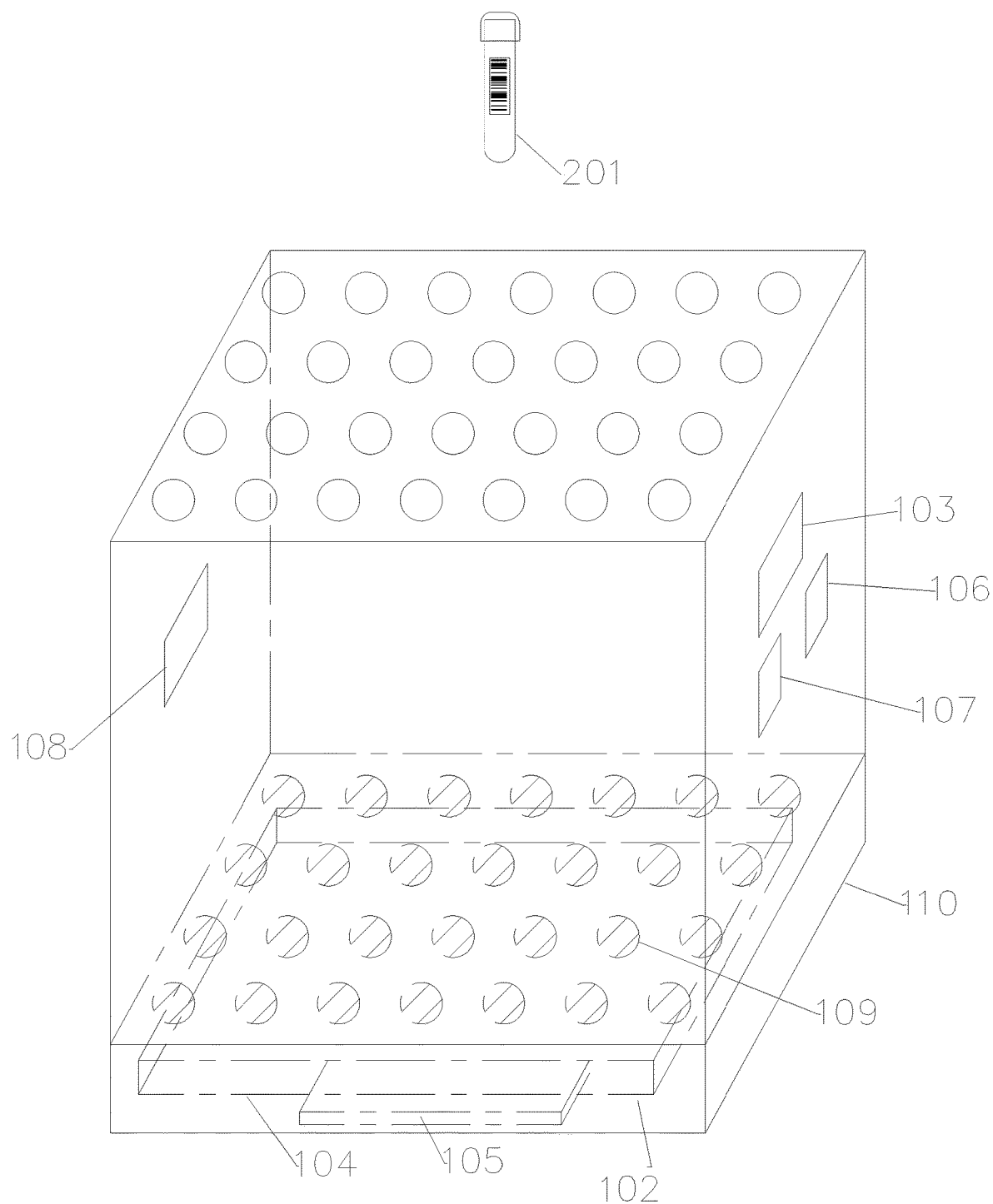
FIG. 3 is a schematic diagram showing a structure of a sample access kit according to an embodiment of this disclosure.

This disclosure also provides a sample storage kit comprising the sample rack 1 and the sample container 201. As shown in FIG. 3, the sample container 201 is provided with an identification. The identification is described in detail below by using a two-dimensional code as an example, but the identification is not limited to the form of two-dimensional code, and may be other computer recognizable forms such as bar code. The two-dimensional code encodes identification information of the sample contained in the sample container 201. The label of the two-dimensional code is easy to fabricate, has no special requirement on its identification equipment, is easy to operate and is low in cost.

Figure 4:
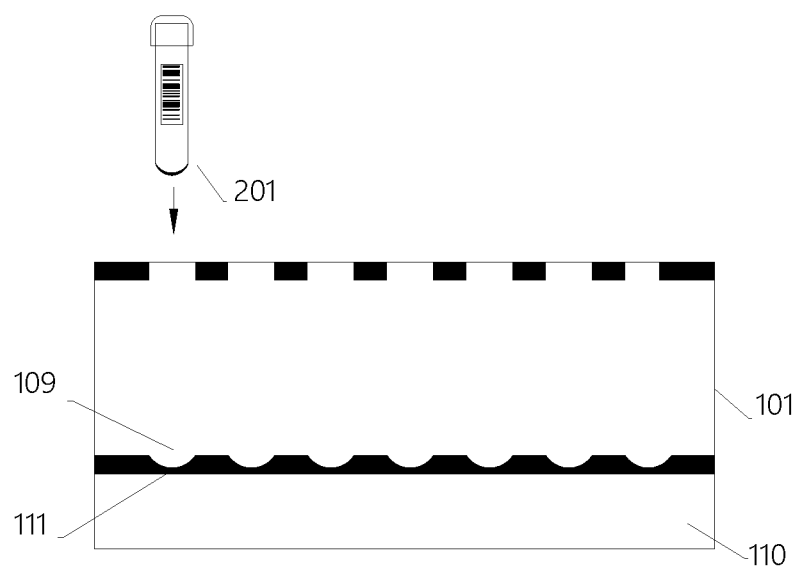
FIG. 4 is a schematic diagram showing a structure in which a sample container mates with an array of grooves according to an embodiment of this disclosure.

In some embodiments, FIG. 4 is a schematic diagram showing a structure in which the sample container 201 mates with the array of grooves 109 according to an embodiment of this disclosure. As shown in FIG. 4, the rack body 101 has a tray 110, and the position collector 102 comprises an array of grooves 109 arranged on the tray 110 for mating with respective sample container 201. A switcher 111 is arranged in respective groove 109, and the switcher 111 is turned ON when the sample container 201 is inserted into the respective groove 109. The position scanner 105 is configured to scan an ON-state of the switcher in the respective groove to determine the position of the sample container 201 on the rack body 101. As shown in FIG. 5, the switcher is composed of two conductive portions along with an insulating layer disposed therebetween. The bottom surface 209 of the sample container 201 is made of a conductive material, and when the sample container 201 is inserted into the groove, the conductive material of the bottom surface 209 contacts the two conductive portions of the switcher in the respective groove, thereby turning ON the switcher. The conductive material of the bottom surface 209 of the sample container 201 may be a metal coating disposed on the bottom surface of the sample container 201.

Figure 6:
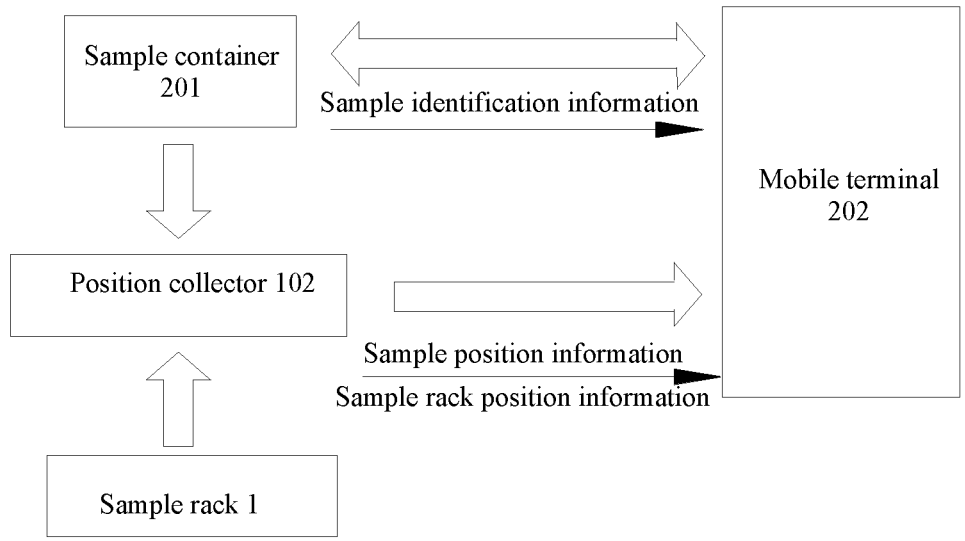
FIG. 6 is a block diagram showing a structure of a sample access system according to an embodiment of this disclosure.

This disclosure also provides a sample access system, and FIG. 6 is a block diagram showing a structure of a sample access system according to an embodiment of this disclosure. As shown in FIG. 6, the sample access system comprises a sample access kit and a mobile terminal 202. The mobile terminal 202 is configured to scan the identification on the sample container 201 to acquire identification information of the sample contained therein and communicate with the sample rack to acquire the identification information of the sample rack and the position of the sample container 201. Before the sample container 201 is placed in the sample rack, the mobile terminal 202 first scans the identification on the sample container 201 to acquire the identification information of the sample. After the sample container 201 is put into the sample rack, the mobile terminal 202 communicates with the sample rack via the communicator 103 to acquire the identification information of the sample rack and position information of the sample container 201. By combining the identification information of the sample, the identification information of the sample rack, and the position information of the sample container by the mobile terminal 202, the operator can obtain instant and effective sample information by operating the mobile terminal 202.

Figure 7:
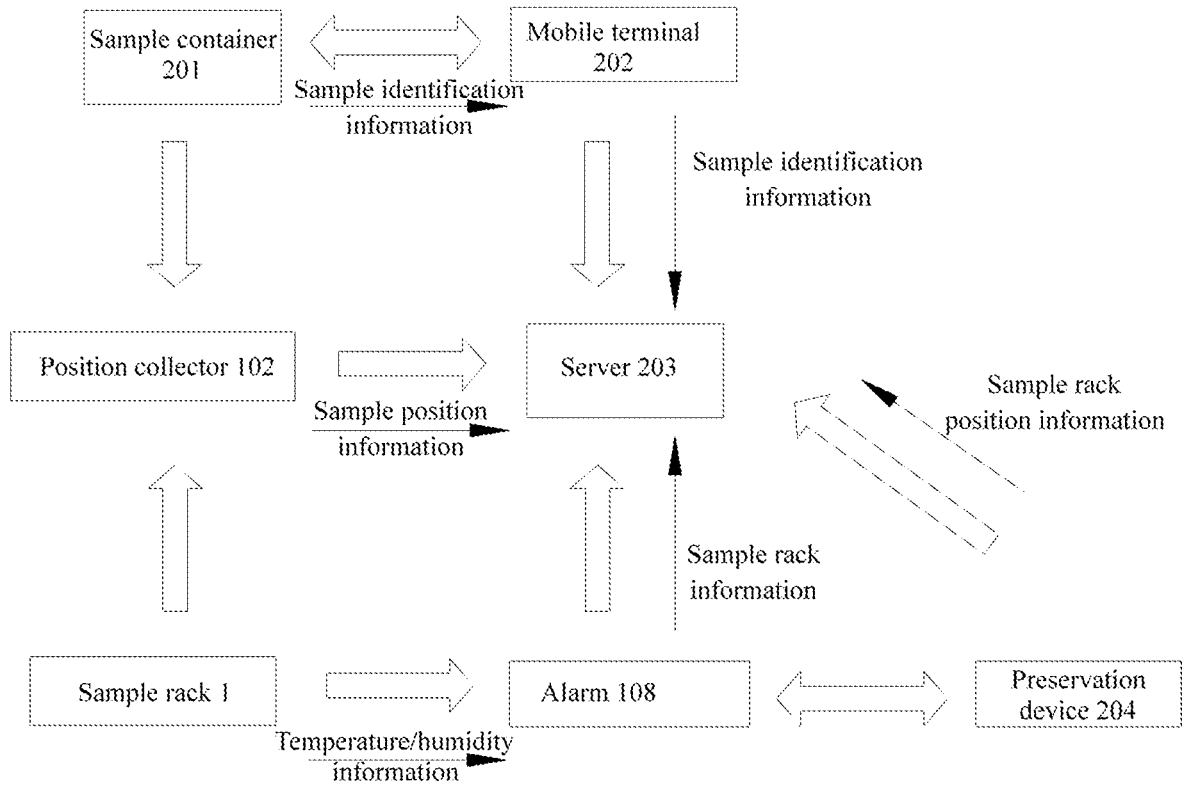
FIG. 7 is another block diagram showing a structure of a sample access system according to an embodiment of this disclosure.

In some embodiments, as shown in FIG. 7, the sample access system further comprises a server 203. The server 203 is configured to communicate with the mobile terminal 202, and the mobile terminal 202 transmits the identification information of the sample, the identification information of the sample rack on which the sample container 201 is placed, and the position information of the sample container 201 to the server 203. The server 203 receives these pieces of information and performs registration.

Figure 8:
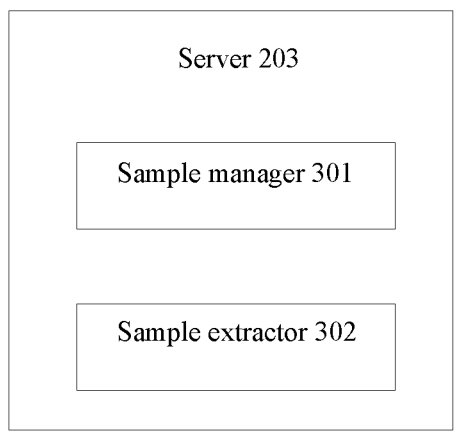
FIG. 8 is a block diagram showing a structure of a server according to an embodiment of this disclosure.

In some embodiments, as shown in FIG. 8, the server 203 comprises a sample manager 301 and a sample extractor 302. The sample manager 301 is configured to perform a registration operation after receiving the identification information of the sample, the identification information of the sample rack on which the respective sample container 201 is placed, and the position of the respective sample container 201. The sample extractor 302 is configured to receive identification information of a sample to be inquired by the user, inquire, according to the identification information of the sample, the identification information of a sample rack accommodating the respective sample container 201 and a position of the respective sample container 201, and notify them to the user. Upon receiving the information relating to the sample, the server 203 invokes the sample manager 301 to perform a registration operation of the sample identification information. When the operator needs to extract the sample, he can inquire the position of the sample according to the identification information of the sample. The server 203 receives the identification information of the sample to be inquired, invokes the sample extractor 302, and then locates the specific position of the respective sample, so as to reduce the manual operation and improve the work efficiency.

In some embodiments, the sample extractor 302 is further configured to receive the identification information of the sample to be inquired via a terminal in communication with the server 203.

In some embodiments, the sample access system further comprises a preservation device. The preservation device will be described in detail below by using an refrigerator as an example, but the preservation device is not limited to such a form as the refrigerator, and it may be other culture preservation devices or the like capable of maintaining a constant temperature, humidity, etc. As shown in FIG. 7, the preservation device is configured to: place a sample access kit; in response to the placement of the sample access kit, communicate with the sample rack in the placed sample access kit via the communicator 103 to acquire identification information of the sample rack; communicate with the server 203 to transmit the acquired identification information of the sample rack, the identification information of the refrigerator 204, and related operation information of the refrigerator 204 to the server 203. The related operation information includes at least operational information about open and close of the door of the refrigerator 204. The refrigerator 204 is provided with a magnetic switch, and after the sample rack carrying samples is placed in the refrigerator 204, the magnetic switch on the refrigerator 204 is triggered, and the refrigerator 204 communicates with the sample rack in the sample access kit to acquire the identification information of the sample rack and send the identification information of the sample rack as well as the position information of the sample rack in the refrigerator 204 to the server 203. If the door of the refrigerator 204 opens or closes, the relevant information is also transmitted to the server 203. The server 203, after communicating with the refrigerator 204, invokes the sample manager 301 to perform sample storage operation and update the relevant information to mobile terminal 202.

In some embodiments, the alarm 108 is further configured to transmit an alarm message to the server 203 via the refrigerator 204 when the sensed temperature or humidity of the environment reaches an alarm threshold. The sample rack collects temperature and humidity information during storage, and when the environment temperature and humidity reach an alarm threshold, the sample rack transmits the alarm message through the communicator 103 to the refrigerator 204, and the refrigerator 204 transmit the alarm information to the server 203. After receiving the alarm message, the server 203 invokes a real-time monitor to process it. The server 203 determined whether to send the alarm message to the mobile terminal 202 based on the specific content of the message.

In some embodiments, the sample extractor 302 is further configured to, upon receiving identification information of a sample to be inquired from the user, transmit the identification information of the refrigerator 204 in which the sample rack accommodating the respective sample container 201 is located to the user. The sample rack further comprises an indicator, and the server 203, upon receiving operation information indicative of open of the door of the refrigerator 204 from the refrigerator 204 where the sample rack accommodating the respective sample container 201 is located, activates the indicator of the sample rack accommodating the respective sample container 201 to indicate the position of the sample to be inquired on the sample rack. When an operator needs to extract a sample, he firstly inquires the position of the sample container corresponding to the sample, and after the sample extractor 302 transmits the identification information of the refrigerator 204 where the sample rack is located to the user, the user can open the corresponding door of the refrigerator 204. The indicator of the sample rack to be extracted displays information such as the position of the sample to be extracted. After the sample is extracted, the sample rack reports extraction confirmation information to the server 203, and the server 203 updates the current state to automatically establish the position information of the sample such that the user can acquire timely and effective information.

Those skilled in the art will appreciate that the above functions of the sample manager 301 and the sample extractor 302 may be implemented by a processor executing instructions stored in a memory.

Moreover, although exemplary embodiments have been described herein, the scope includes any and all embodiments having equivalent elements, modifications, omissions, combinations (e.g., solutions across the various embodiments), adaptations, or alterations based on this disclosure. Elements in the claims are to be construed broadly based on the language employed in the claims and not limited to examples described in the specification or during the implementation of the application, and the examples are to be construed as non-exclusive. It is intended, therefore, that the specification and examples to be considered as exemplary only, with a true scope and spirit being indicated by the entire scope of the following claims and their equivalents.

The term of the device used in this disclosure is intended to denote a corresponding one of an analog circuit, a digital circuit, and a program module that implements a corresponding function, and in which form the analog circuit, the digital circuit, and the program module is used depends on an application scenario of the device and the corresponding function to be implemented. The technical features regarding the device such as the communicator 103, the position scanner 105, and the sample manager 301 involved in this disclosure may be a Complex Instruction Set Arithmetic (CISC) microprocessor, a Reduced Instruction Set Arithmetic (RISC) microprocessor, a Very Long Instruction Word (VLIW) microprocessor, a processor running other instruction sets, or a processor running a combination of instruction sets, and may also be one or more special-purpose processing devices such as an Application Specific Integrated Circuit (ASIC), a Field Programmable Gate Array (FPGA), a Digital Signal Processor (DSP), a system on a chip (SoC), and the like.

This disclosure describes various operations or functions that may be implemented as or defined as software code or instructions. Such content may be directly executable ("object" or "executable" form) source code or differencing code ("incremental" or "patch" code). Software implementations of the embodiments described herein may be provided via an article in which code or instructions are stored or via a method of operating a communication interface to transmit data via the communication interface.

The above description is intended to be illustrative, and not restrictive. For example, the above examples (or one or more aspects thereof) may be used in combination with each other. For example, other embodiments may be utilized by those of ordinary skill in the art upon reading the foregoing description. In addition, in the above implementations, various features may be grouped together to simplify the disclosure. This should not be construed as an intention that the disclosed features not be claimed as essential to any claim. Rather, the subject matter of this disclosure may contain less features than all features of a particular disclosed embodiment. Thus, the following claims are hereby incorporated into the implementations as examples or embodiments, with each claim standing on its own as a separate embodiment, and it is contemplated that these embodiments can be combined with each other in various combinations and permutations. The scope of the disclosure should be determined with reference to the appended claims, along with the full scope of equivalents to which these claims are entitled.

The above embodiments are merely exemplary embodiments of this disclosure, and are not intended to limit this disclosure, and the scope of protection of this disclosure is defined by the claims. Various modifications or equivalent substitutions may be made to the disclosure by those skilled in the art within the spirit and scope of the disclosure, and such modifications or equivalent substitutions should be considered to also fall within the scope of protection of the disclosure.

What is claimed is:

1. A sample rack, comprising:
   a rack body for placing a sample container;
   a position collector configured to acquire a position of the sample container placed on the rack body; and
   a communicator configured to transmit identification information of the sample rack and the acquired position of the sample container on the rack body,
   wherein the position collector comprises:
   an array of grooves for mating with the respective sample container,
   a switcher arranged in each respective groove, wherein the switcher is composed of two conductive portions and an insulating layer disposed therebetween, and the switcher is turned on when the sample container is inserted into the corresponding groove and a bottom surface of the sample container directly contacts each of the two conductive portions of the switcher, the bottom surface of the sample container is made of a conductive material; and
   a position scanner configured to scan an ON-state of the switcher in the respective groove to determine the position of the sample container on the rack body.

2. The sample rack according to claim 1, wherein the rack body has a tray, and
the array of grooves is arranged on the tray.

3. The sample rack according to claim 1, further comprising at least one of:
   a temperature sensor configured to sense a temperature of an environment and communicably connected with the communicator; or
   a humidity sensor configured to sense a humidity of the environment and communicatively connected with the communicator.

4. The sample rack according to claim 3, further comprising an alarm configured to send an alarm message when the sensed temperature or humidity of the environment reaches an alarm threshold, the alarm message including the identification information of the sample rack.

5. The sample rack according to claim 1, further comprising an indicator configured to receive the position of the sample container on the sample rack from the communicator and indicate the position of the sample container on the sample rack.

6. The sample rack according to claim 2, further comprising a bottom compartment configured to receive at least a portion of the position collector, the bottom compartment located between the tray and the array of grooves.

7. A sample access kit, comprising:
   a sample rack comprising: a rack body for placing a sample container; a position collector configured to acquire a position of the sample container placed on the rack body; and
   a communicator configured to transmit identification information of the sample rack and the acquired position of the sample container on the rack body; and
   wherein the sample container has an identification disposed thereon, the identification representing identification information of a sample contained in the sample container,
   wherein the position collector comprises:
   an array of grooves for mating with the respective sample container,
   a switcher arranged in each respective groove, wherein the switcher is composed of two conductive portions and an insulating layer disposed therebetween, and the switcher is turned on when the sample container is inserted into the corresponding groove and a bottom surface of the sample container directly contacts each of the two conductive portions of the switcher, the bottom surface of the sample container is made of a conductive material; and
   a position scanner configured to scan an ON-state of the switcher in the respective groove to determine the position of the sample container on the rack body.

8. The sample access kit according to claim 7, wherein the rack body has a tray,
the array of grooves is arranged on the tray.

9. A sample access system, comprising:
   a sample access kit comprising a sample rack and a sample container,
   wherein the sample rack comprises: a rack body for placing a sample container; a position collector configured to acquire a position of the sample container placed on the rack body; and a communicator configured to transmit identification information of the sample rack and the acquired position of the sample container on the rack body; and
   the sample container having an identification disposed thereon, the identification representing identification information of a sample contained in the sample container; and a mobile terminal configured to: scan the identification on the sample container to acquire the identification information of the sample contained in the sample container; and communicate with the sample rack to acquire the identification information of the sample rack and the position of the sample container on the sample rack, wherein the position collector comprises:

an array of grooves for mating with the respective sample container, a switcher arranged in each respective groove, wherein the switcher is composed of two conductive portions and an insulating layer disposed therebetween, and the switcher is turned on when the sample container is inserted into the corresponding groove and a bottom surface of the sample container directly contacts each of the two conductive portions of the switcher, the bottom surface of the sample container is made of a conductive material; and a position scanner configured to scan an ON-state of the switcher in the respective groove to determine the position of the sample container on the rack body.

10. The sample access system according to claim 9, further comprising:

a server configured to communicate with the mobile terminal to receive and to register the identification information of the sample, the identification information of the sample rack, and the position of the sample container on the sample rack.

11. The sample access system according to claim 10, wherein the server is further configured to:

perform a registration operation after receiving the identification information of the sample, the identification information of the sample rack accommodating the respective sample container, and the position of the respective sample container on the sample rack; and receive identification information of the sample to be inquired from a user, inquire the identification information of the sample rack accommodating the respective sample container and the position of the respective sample container on the sample rack according to the identification information of the sample, and notify the user.

12. The sample access system according to claim 11, wherein the server is further configured to receive the identification information of the sample to be inquired via the mobile terminal in communication with the server.

13. The sample access system according to claim 11, further comprising a preservation device configured to store the sample access kit and a communication device, the communication device configured to:

communicate, in response to the placement of the sample access kit, with the sample rack in the placed sample access kit via the communicator to acquire the identification information of the sample rack, and communicate with the server to transmit the acquired identification information of the sample rack, identification information of the preservation device and information related to the operation of the preservation device to the server.

14. The sample access system according to claim 13, wherein the information related to the operation of the preservation device at least comprises operation information about opening and closing of a door of the preservation device.

15. The sample access system according to claim 13, further comprising an alarm configured to transmit, by the communicator, an alarm message to the server via the communication device of the preservation device, when a sensed temperature or humidity of an environment reaches an alarm threshold.

16. The sample access system according to claim 13, wherein the server is further configured to:

upon receiving the identification information of the sample to be inquired from the user, transmit the identification information of the preservation device where the sample rack accommodating the respective sample container is located to the user.

17. The sample access system according to claim 13, wherein the sample rack further comprises an indicator, and in a case where the server receives, by the communication device, operation information about opening of the door of the preservation device from the preservation device where the sample rack accommodating the respective sample container is stored, the server activates the indicator of the sample rack accommodating the respective sample container to indicate the position of the sample to be inquired on the sample rack.

\* \* \* \* \*